US010828613B2

(12) United States Patent
Benham et al.

(10) Patent No.: US 10,828,613 B2
(45) Date of Patent: *Nov. 10, 2020

(54) SYSTEM AND METHOD FOR CATALYST PREPARATION

(71) Applicant: Chevron Phillips Chemical Company LP, The Woodlands, TX (US)

(72) Inventors: Elizabeth A. Benham, Spring, TX (US); Albert P. Masino, Tulsa, OK (US); Qing Yang, Bartlesville, OK (US); Randy S. Muninger, Dewey, OK (US); Rebecca A. Gonzales, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/248,960

(22) Filed: Jan. 16, 2019

(65) Prior Publication Data

US 2019/0143287 A1 May 16, 2019

Related U.S. Application Data

(60) Division of application No. 15/216,742, filed on Jul. 22, 2016, now abandoned, which is a continuation of
(Continued)

(51) Int. Cl.
*B01J 4/02* (2006.01)
*C08F 2/01* (2006.01)
(Continued)

(52) U.S. Cl.
CPC .............. *B01J 4/02* (2013.01); *B01J 4/008* (2013.01); *B01J 14/00* (2013.01); *B01J 19/06* (2013.01);
(Continued)

(58) Field of Classification Search
CPC . B01J 4/008; B01J 4/02; B01J 19/0006; B01J 19/1837; B01J 2204/002;
(Continued)

(56) References Cited

U.S. PATENT DOCUMENTS 3,242,099 A 3/1966 Manyik et al.
3,248,179 A 4/1966 Norwood
(Continued)

FOREIGN PATENT DOCUMENTS

| CA | 2759535 A1 | 8/2012 |
| EP | 0564948 A1 | 10/1993 |
| EP | 1713840 B1 | 4/2019 |

OTHER PUBLICATIONS

Partial International Search Report issued in corresponding application No. PCT/US19/23419 dated May 24, 2019, 3 pages.
(Continued)

*Primary Examiner* — Lessanework Seifu
(74) *Attorney, Agent, or Firm* — Merchant & Gould P.C.

(57) ABSTRACT

Techniques are provided for catalyst preparation. A system for catalyst preparation may include an agitator disposed inside a polymerization catalyst tank and configured to mix a polymerization catalyst and a solvent to generate a polymerization catalyst solution. The system may also include a heating system coupled to the polymerization catalyst tank and configured to maintain a temperature of the polymerization catalyst solution above a threshold. The system may also include a precontactor configured to receive feed streams comprising an activator and the polymerization catalyst solution from the polymerization catalyst tank to generate a catalyst complex. The system may also include a transfer line configured to transfer the catalyst complex from an outlet of the precontactor to a reactor.

21 Claims, 6 Drawing Sheets

Related U.S. Application Data application No. 14/340,205, filed on Jul. 24, 2014, now abandoned, which is a division of application No. 13/655,024, filed on Oct. 18, 2012, now Pat. No. 8,821,800.

(51) Int. Cl.

| | | |
|---|---|---|
| *B01J 19/18* | (2006.01) | |
| *B01J 4/00* | (2006.01) | |
| *C08F 4/00* | (2006.01) | |
| *B01J 14/00* | (2006.01) | |
| *B01J 19/06* | (2006.01) | |
| *B01J 19/12* | (2006.01) | |
| *C08F 110/02* | (2006.01) | |

(52) U.S. Cl.
CPC ........... *B01J 19/123* (2013.01); *B01J 19/127* (2013.01); *B01J 19/1837* (2013.01); *C08F 4/00* (2013.01); *C08F 110/02* (2013.01); *B01J 2204/002* (2013.01); *B01J 2219/00094* (2013.01); *B01J 2219/00164* (2013.01); *B01J 2219/00182* (2013.01); *B01J 2219/00186* (2013.01); *B01J 2219/0801* (2013.01); *C08F 2420/00* (2013.01); *C08F 2500/05* (2013.01); *C08F 2500/07* (2013.01); *C08F 2500/08* (2013.01)

(58) Field of Classification Search
CPC .... B01J 2219/00957; B01J 2219/00972; B01J 2219/00975; B01J 2219/0097; C08F 210/16; C08F 210/14; C08F 10/00; C08F 2/01
See application file for complete search history.

(56) References Cited

U.S. PATENT DOCUMENTS

| | | | |
|---|---|---|---|
| 4,501,885 | A | 2/1985 | Sherk et al. |
| 4,588,790 | A | 5/1986 | Jenkins, III et al. |
| 4,794,096 | A | 12/1988 | Ewen |
| 4,808,561 | A | 2/1989 | Welborn, Jr. |
| 5,436,304 | A | 7/1995 | Griffin et al. |
| 5,532,749 | A | 7/1996 | Hong |
| 5,565,175 | A | 10/1996 | Hottovy et al. |
| 5,575,979 | A | 11/1996 | Hanson |
| 5,576,259 | A | 11/1996 | Hasegawa et al. |
| 5,723,804 | A | 3/1998 | Replogle |
| 5,807,938 | A | 9/1998 | Kaneko et al. |
| 5,919,983 | A | 7/1999 | Rosen et al. |
| 6,107,230 | A | 8/2000 | McDaniel et al. |
| 6,165,929 | A | 12/2000 | McDaniel et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,524,987 | B1 | 2/2003 | Collins et al. |
| 6,548,441 | B1 | 4/2003 | McDaniel et al. |
| 6,548,442 | B1 | 4/2003 | McDaniel et al. |
| 6,576,583 | B1 | 6/2003 | McDaniel et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,750,302 | B1 | 6/2004 | McDaniel et al. |
| 6,833,415 | B2 | 12/2004 | Kendrick |
| 7,026,494 | B1 | 4/2006 | Yang et al. |
| 7,041,617 | B2 | 5/2006 | Jensen et al. |
| 7,199,073 | B2 | 4/2007 | Martin et al. |
| 7,226,886 | B2 | 6/2007 | Jayaratne et al. |
| 7,294,599 | B2 | 11/2007 | Jensen et al. |
| 7,312,283 | B2 | 12/2007 | Martin et al. |
| 7,433,761 | B2 | 10/2008 | Battiste |
| 7,517,939 | B2 | 4/2009 | Yang et al. |
| 7,531,606 | B2 | 5/2009 | Hendrickson |
| 7,598,327 | B2 | 10/2009 | Shaw |
| 7,601,665 | B2 | 10/2009 | McDaniel et al. |
| 7,884,163 | B2 | 2/2011 | McDaniel et al. |
| 7,919,639 | B2 | 4/2011 | Murray et al. |
| 8,080,681 | B2 | 12/2011 | Murray et al. |
| 8,114,946 | B2 | 2/2012 | Yang et al. |
| 8,288,487 | B2 | 10/2012 | Yang et al. |
| 8,309,485 | B2 | 11/2012 | Yang et al. |
| 8,329,834 | B2 | 12/2012 | Masino et al. |
| 8,623,973 | B1 | 1/2014 | McDaniel et al. |
| 8,629,292 | B2 | 1/2014 | Buck et al. |
| 8,680,218 | B1 | 3/2014 | Yang et al. |
| 8,703,886 | B1 | 4/2014 | Yang et al. |
| 8,822,608 | B1 | 9/2014 | Bhandarkar et al. |
| 9,040,642 | B2 | 5/2015 | Buck et al. |
| 9,540,457 | B1 | 1/2017 | Ding et al. |
| 2002/0156205 | A1 | 10/2002 | Long et al. |
| 2003/0114608 | A1 | 6/2003 | Tharappel et al. |
| 2004/0002420 | A1 | 1/2004 | Wu et al. |
| 2005/0272891 | A1 | 12/2005 | Fouarge et al. |
| 2015/0197582 | A1 | 7/2015 | Cymbaluk et al. |
| 2016/0325252 | A1 | 11/2016 | Benham et al. |
| 2016/0347887 | A1 | 12/2016 | Ege et al. |

OTHER PUBLICATIONS

International Search Report and Written Opinion issued in corresponding application No. PCT/US2018/041430 dated Oct. 25, 2018, 19 pages.

SYSTEM AND METHOD FOR CATALYST PREPARATION

CROSS-REFERENCE TO RELATED APPLICATIONS

This application is a divisional of U.S. patent application Ser. No. 15/216,742, filed on Jul. 22, 2016, which is a continuation of U.S. patent application Ser. No. 14/340,205, filed on Jul. 24, 2014, which is a divisional of U.S. patent application Ser. No. 13/655,024, filed on Oct. 18, 2012, now U.S. Pat. No. 8,821,800, the disclosures of which are incorporated herein by reference in their entirety.

BACKGROUND

The present disclosure relates generally to catalyst preparation, and more particularly, to preparation of metallocene catalysts.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Catalysts can be employed to facilitate the formation of products through chemical reactions. It is often desirable to prepare the catalyst in a certain way to achieve desired properties of the catalyst and/or the products. For example, in certain polymerization manufacturing facilities, the catalyst is prepared off-site by a vendor and is then shipped to the polymerization reaction facility. At the vendor facility, the catalyst may be dissolved in a solvent to form a catalyst solution, which may be used by the polymerization manufacturing facility directly or with some additional processing or handling. However, the concentration of the catalyst in the solvent may be limited by the solubility of the catalyst in the solvent. In other words, attempting to dissolve greater amounts of the catalyst in the solution may cause precipitation of the catalyst out of solution, which may be undesirable. In addition, the solubility of the catalyst in the solvent may be affected by temperature. For example, the solubility of the catalyst may decrease at low temperatures. Thus, the concentration of the catalyst in the solvent may be less than desirable, thereby resulting in feeding the catalyst solution at high flow rates. In addition, it is now recognized that issues with catalyst concentration in the solvent may necessitate increased sizes of storage tanks, transfer lines, pumps, and other equipment associated with handling the catalyst solution to facilitate managing the high flow rates of the catalyst solution. This may add to both capital and operating expenditures of the polymerization manufacturing facility. Further, it is now recognized that the costs and other considerations associated with transporting catalyst solution may be greater than those associated with the transportation of only the catalyst.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for catalyst solution preparation. More specifically, the present disclosure is directed to techniques for catalyst solution preparation by an on-site catalyst preparation system. As used herein, the term "on-site" refers to being on the same location and/or integral with a polymerization manufacturing facility and any adjacent associated manufacturing facilities. The polymerization manufacturing facility may produce various polymers in a variety of different reactors, such as, but not limited to, fluidized bed reactors, gas-phase reactors, loop slurry reactors, or any combination thereof. Such reactor systems may be modeled using a continuous ideal stirred tank reactor (CISTR) model.

Reactors of a polymerization manufacturing facility may receive a monomer, a diluent, and a catalyst complex prepared by a catalyst preparation system in accordance with present embodiments to produce polymers. In certain embodiments, a polymerization catalyst tank of the catalyst preparation system mixes a polymerization catalyst and a solvent using an agitator to generate a polymerization catalyst solution. A heating system coupled to polymerization catalyst tank may help maintain a temperature of the polymerization catalyst solution above a threshold. For example, the threshold may be determined to help prevent precipitation of the polymerization catalyst out of the polymerization catalyst solution. A precontactor of the catalyst preparation system may then receive a cocatalyst, an activator, and the polymerization catalyst solution from the polymerization catalyst tank to generate the catalyst complex. The precontactor may also include a heating system. A transfer line may be used to transfer the catalyst complex from the precontactor to the reactors of the polymerization manufacturing facility.

By preparing the polymerization catalyst solution on-site, the polymerization catalyst may be shipped to the polymerization manufacturing facility from the vendor in solid form (e.g., a dry powder), thereby simplifying and reducing costs associated with the transportation of the polymerization catalyst. Further, the solvent used to dissolve polymerization catalyst may be selected to be particularly compatible and/or desirable for use in the reactors of the polymerization manufacturing facility. For example, in certain embodiments, the solvent may be a material already being fed to the reactor, such as a comonomer. In addition, by heating the polymerization catalyst solution in the catalyst preparation system, the concentration of the polymerization catalyst may be greater than that of catalyst solutions shipped to the polymerization manufacturing facility by vendors. Thus, the storage tanks and other equipment associated with the polymerization catalyst solution may be smaller and less expensive than equipment associated with vendor-supplied catalyst solutions. In addition, the frequency of preparing batches of catalyst solution may be reduced. Further, use of high-concentration catalyst solution may improve the control of the polymerization reaction. For example, the ratio of high-molecular weight polymer to low-molecular weight polymer may be facilitated by using high-concentration catalyst solution.

Figure 1:
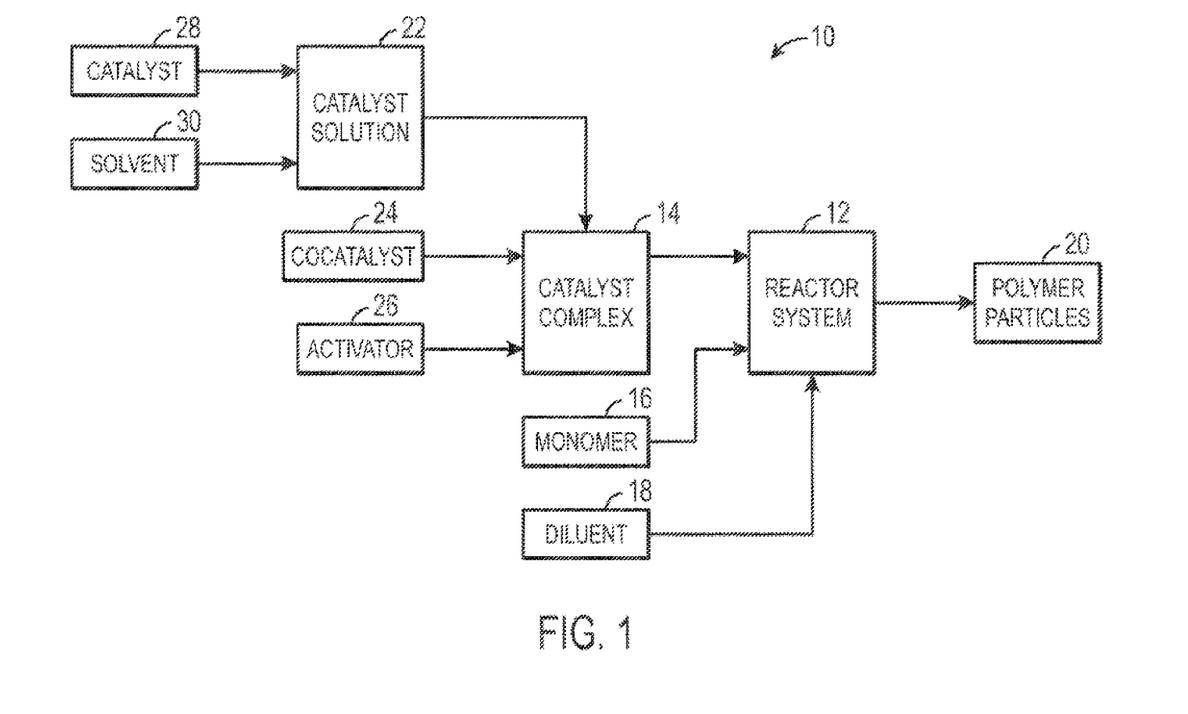
FIG. 1 is a block diagram of an embodiment of a polyolefin manufacturing system with a catalyst preparation system in accordance with present embodiments.

FIG. 1 depicts an embodiment of a manufacturing system 10 that employs catalysts to produce a polymer product through chemical reactions. In particular, FIG. 1 is a schematic representation of a manufacturing process for producing polyolefins, such as polyethylene homopolymer, copolymer, and/or terpolymer, among others. Although the catalyst preparation techniques described herein are generally described with respect to polyolefin production, the techniques can be applied to any chemical reactor system that can be modeled using a continuous ideal stirred tank reactor model. For example, the catalyst preparation techniques can be applied to other types of polymer production.

As shown in FIG. 1, the manufacturing system 10 includes a reactor system 12, which receives various feedstocks, such as a catalyst complex 14, a monomer 16, and/or a diluent 18. The catalyst complex 14 and its preparation are described in detail below. The monomer 16 may include one or more monomers and/or comonomers, such as, but not limited to, ethylene, propylene, butene, hexene, octene, decene, and so forth. The diluent 18 may include one or more diluents, such as, but not limited to, an inert hydrocarbon that is liquid at reaction conditions, such as isobutane, propane, n-butane, n-pentane, i-pentane, neopentane, n-hexane, n-heptane, cyclohexane, cyclopentane, methylcyclopentane, or ethylcyclohexane, among others. In certain embodiments, the diluent 18 may be employed to suspend catalyst particles and polymer particles within the reactor vessels of the reactor system 12. In further embodiments, the reactor system 12 may also receive other materials, such as, but not limited to, chain transfer agents (e.g. hydrogen), catalysts, co-catalysts, and other additives.

The reactor system 12 can include one or more polymerization reactors, such as liquid-phase reactors, gas-phase reactors, or a combination thereof. Multiple reactors may be arranged in series, in parallel, or in any other suitable combination or configuration. Within the polymerization reactors, the monomer 16 (e.g., one or more monomers and/or comonomers) may be polymerized to form a product containing polymer particles 20, typically called fluff or granules. According to certain embodiments, the monomer 16 may include 1-olefins having up to 10 carbon atoms per molecule and typically no branching nearer the double bond than the 4-position. For example, the monomer 16 may include monomers and comonomers such as ethylene, propylene, butene, 1-pentene, 1-hexene, 1-octene, 1-decene, or any combination thereof. The polymer particles 20 may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired properties of the polymer particles 20.

Product effluent, which includes the formed polymer particles 20, as well as non-polymer components, such as the diluent 18, unreacted monomer 16, and residual catalyst, exits the reactor system 12 and enters various systems, such as a product recovery system, an extrusion system, and/or a loadout system, to produce extruded polymer pellets. Examples of polymer pellets that may be produced by the manufacturing system 10 include, but are not limited to, low density polyethylene (LDPE), linear low density polyethylene (LLDPE), medium density polyethylene (MDPE), high density polyethylene (HDPE), and enhanced polyethylene such as bimodal grades. The various types and grades of polyethylene pellets may be marketed, for example, under the brand names Marlex® polyethylene or MarFlex® polyethylene of Chevron-Phillips Chemical Company, LP, of The Woodlands, Tex., USA.

The produced polymer (e.g., polyethylene) pellets can be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys, and an array of containers and plastic products. Further, the products and components formed from the polymer pellets may be further processed and assembled prior to distribution and sale to the consumer. For example, the polymer pellets are generally subjected to further processing, such as blow molding, injection molding, rotational molding, blown film, cast film, extrusion (e.g., sheet extrusion, pipe and corrugated extrusion, coating/lamination extrusion, etc.), and so on.

Returning to FIG. 1, the catalyst complex 14 may be prepared by combining a catalyst solution 22, a cocatalyst 24, and activator 26. Examples of the cocatalyst 24 include, but are not limited to, organometallic compounds, such as triisobutylaluminum, triethylaluminum or tri-ethyl boron, alkyl aluminum compounds, methyl aluminoxane, and so forth. Examples of the activator 26 include, but are not limited to, solid super acids and chemically-treated solid oxides. In one embodiment, the solid oxide can have a surface area of from about 100 to about 1000 $m^2/g$. In yet another embodiment, the solid oxide can have a surface area of from about 200 to about 800 $m^2/g$. In still another embodiment, the solid oxide can have a surface area of from about 250 to about 600 $m^2/g$.

When the activator 26 is a chemically-treated solid oxide, it can include a solid inorganic oxide that includes oxygen and one or more elements selected from Group 2, 3, 4, 5, 6, 7, 8, 9, 10, 11, 12, 13, 14, or 15 of the periodic table, or that includes oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can include oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide used as the activator 26 can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO^3$, $Y_2O_3$, ZnO, $ZrO_2$, and the like, including mixed oxides thereof, coatings of one oxide with another, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

Returning to FIG. 1, the catalyst solution 22 may be prepared by combining a catalyst 28 and a solvent 30. Specifically, the catalyst 28 may be dissolved in the solvent 30. In one embodiment, the catalyst 28 may essentially be a solid material. Examples of the catalyst 28 include, but are not limited to, metallocene catalysts, Ziegler-Natta catalysts, chromium-based catalysts, vanadium-based catalysts, nickel-based catalysts, or a combination thereof, among others. Examples of chromium-based catalysts include, but are not limited to, chrome, chromocene, chrome titanium, chrome silica, chrome with aluminum phosphate, and so forth. Examples of the solvent 30 include, but are not limited to, comonomers, such as those listed above, 1-hexene, cyclohexane, heptane, an alkene, an alkane, a cycloalkene, a cycloalkane, or any combination thereof. In a certain embodiment, the solvent 30 is 1-hexene and excludes toluene. Use of 1-hexene may be more desirable than toluene because 1-hexene has fewer environmental concerns than toluene. In addition, 1-hexene is used (i.e., chemically consumed or reacted) during polymerization and thus, would appear as a residual in the polymer particles 20 in smaller quantities than toluene, which is not used during polymerization. Certain catalysts 28 may be less soluble in 1-hexene than toluene. Thus, the heating of the catalyst solution 22, as described in detail below, may facilitate use of 1-hexene instead of toluene and help prevent precipitation of the catalyst 28.

Figure 2:
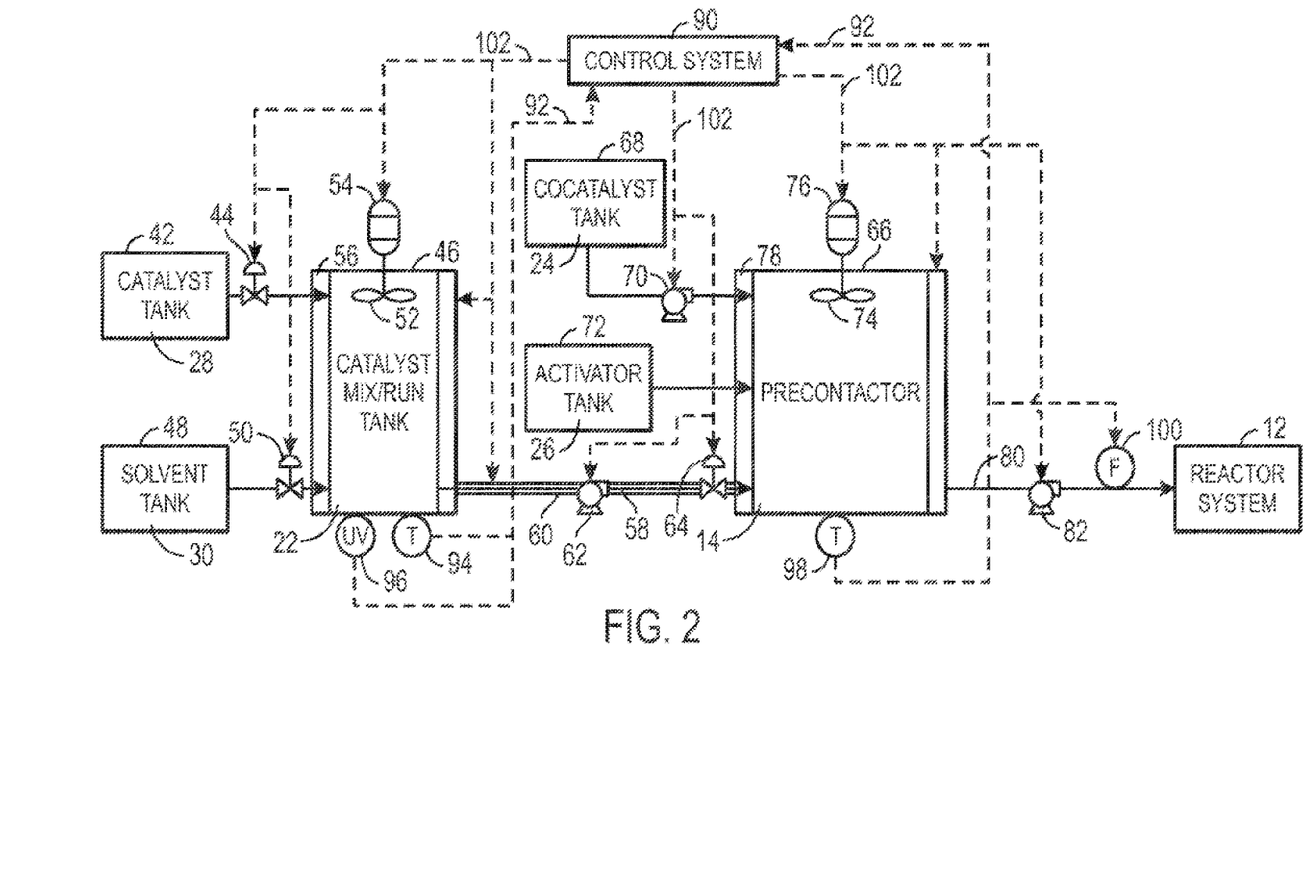
FIG. 2 is a schematic flow diagram of an embodiment of a catalyst preparation system that may be employed in the polyolefin manufacturing system of FIG. 1, in accordance with present embodiments.

FIG. 2 depicts an embodiment of a catalyst preparation system 40 that may be used to prepare the catalyst complex 14 fed to the reactor system 12. Specifically, the catalyst preparation system 40 may include a catalyst tank 42 to store the catalyst 28. In one embodiment, a catalyst control valve 44 may be used as a transfer means to control the transfer of the catalyst 28 from the catalyst tank 42 to a catalyst mix/run tank 46. Other catalyst transfer means can also be employed either with or without a catalyst control valve 44. For example, the catalyst 28 may be pressured (e.g., via the use of nitrogen), pumped, conveyed, or otherwise transported to the catalyst mix/run tank 46. The catalyst preparation system 40 may also include a solvent tank 48 to store the solvent 30. In one embodiment, a solvent control valve 50 may be used to control the transfer of the solvent 30 to the catalyst mix/run tank 46. Other solvent transfer means can also be used either with or without a solvent control valve 50. For example, the solvent 30 may be pressured from the solvent tank 48 or in certain embodiments, a pump may be used to transfer the solvent 30 from the solvent tank 48. Indeed, in some embodiments, a pump may replace or cooperate with the solvent control valve 50.

As shown in FIG. 2, the catalyst mix/run tank 46 includes an agitator 52 that is powered by a motor 54. The agitator 52 may be used to dissolve and/or mix the catalyst 28 and the solvent 30 in the catalyst mix/run tank 46. Thus, the agitator 52 may help speed the mixing of the catalyst 28 and the solvent 30 and/or improve the consistency of the catalyst solution 22. In certain embodiments, the catalyst mix/run tank 46 may include a heating system 56 to heat the catalyst solution 22. Examples of the heating system 56 include, but are not limited to, a heated tempered water jacket, a heated tempered water coil, an electrical clamp-on jacket, or any other suitable heating system. By heating the catalyst solution 22 with the heating system 56, greater concentrations of catalyst 28 may be achieved without resulting in precipitation of the catalyst 28. In addition, the heating system 56 may be used whenever both the catalyst 28 and the solvent 30 are present at the same time to help prevent precipitation of the catalyst 28 at low temperatures. A transfer line 58 may be used to transfer the catalyst solution 22 from the catalyst mix/run tank 46. The transfer line 58 may include a piping heating system 60, such as, but not limited to, a heated tempered water jacket, electrical tracing, or any other suitable heating system, which may be used to maintain a temperature of the catalyst solution 22 above a threshold as the catalyst solution 22 travels through the transfer line 58. A catalyst solution pump 62 may be coupled to the transfer line 58 and used to transfer the catalyst solution 22 from the catalyst mix/run tank 46. In addition, the transfer line 58 may include a catalyst solution control valve 64 to control the transfer of the catalyst solution 22 from the catalyst mix/run tank 46 to a precontactor 66 either with or without a catalyst solution pump 62.

In addition to the catalyst solution 22 from the catalyst mix/run tank 46, the precontactor 66 may receive the cocatalyst 24 from a cocatalyst tank 68 via a cocatalyst pump 70. In other embodiments, the cocatalyst 24 may be pressured to the precontactor 66 or otherwise transferred. In further embodiments, the cocatalyst 24 may be transferred directly from the cocatalyst tank 68 to one or more reactors in the reactor system 12, bypassing the precontactor 66. An activator tank 72 may store the activator 26 before being transferred to the precontactor 66 via pressuring, a pump, or the like. The precontactor 66 includes a precontactor agitator 74 powered by a precontactor motor 76. The precontactor agitator 74 may be used to thoroughly mix the catalyst solution 22 with the cocatalyst 24 and the activator 26. The precontactor 66 may also include a precontactor heating system 78 to heat the catalyst complex 14 in the precontactor 66. The precontactor heating system 78 may be similar to the heating system 56 for the catalyst mix/run tank 46 described above. In one embodiment, the precontactor heating system 78 may be used only during preparation of the catalyst complex 14 and then shut off afterwards. A precontactor transfer line 80 may be used to transfer the catalyst complex 14 from the precontactor 66. In certain embodiments, one or more precontactor pumps 82 may be used to transfer the catalyst complex 14 from the precontactor 66 to one or more reactors in the reactor system 12.

Regardless of the specific catalyst 28 used, operating conditions within the catalyst preparation system 40 may be controlled to produce the catalyst complex 14 with desired properties. For example, a control system 90 can be employed to control operating conditions within the manufacturing system 10, such as the catalyst preparation system 40. For example, the control system 90 may be employed to adjust the flow rates, temperatures, and/or other properties of the catalyst 28, solvent 30, catalyst solution 22, cocatalyst 24, activator 26, and/or catalyst complex 14. Further, the control system 90 may be employed to transition from feeding one type of catalyst complex 14 to the reactor system 12 to feeding another type of catalyst complex 14 to the reactor system 12. Moreover, the control system 90 may be employed to monitor and/or adjust operating conditions within the manufacturing system 10, such as temperatures, pressures, the reaction rate, and the solids concentrations, among others. According to certain embodiments, the control system 90 may receive input signals 92 from sensors (such as, temperature sensors, pressure sensors, and/or flow transducers, among others) within the manufacturing system 10 that are indicative of operating conditions and may then generate control signals 102 to adjust operating conditions of the manufacturing system 10.

Specifically, as shown in FIG. 2, the control system 90 may receive input signals 92 from various sensors disposed within the catalyst preparation system 40, such as, but not limited to, a catalyst mix/run tank temperature sensor 94, a catalyst mix/run tank concentration sensor 96, a precontactor temperature sensor 98, a catalyst complex flow sensor 100, and so forth. In other embodiments, the control system 90 may receive input signals 92 from other sensors disposed in the catalyst preparation system 40 and/or the manufacturing system 10. Based on the input signals 92, the control system 90 may transmit control signals 102 to various devices and equipment disposed in the catalyst preparation system 40, such as, but not limited to, any catalyst transfer means, the catalyst control valve 44, any solvent transfer means, the solvent control valve 50, the catalyst mix/run tank motor 54, the catalyst mix/run tank heating system 56, the transfer pipe heating system 60, the catalyst solution transfer pump 62, the catalyst solution control valve 64, the cocatalyst pump 70, the precontactor motor 76, the precontactor pump 82, the precontactor heating system 78, and so forth.

In certain embodiments, the input signal 92 received by the control system 90 may be indicative of a demand for the catalyst 28 in the catalyst mix/run tank 46. For example, the input signal 92 may be indicative of a concentration of the catalyst 28 in the catalyst solution 22 that is lower than a setpoint and may be transmitted by the catalyst mix/run tank concentration sensor 96. In response, the control system 90 may activate an output, such as an actuator for the catalyst control valve 44, to supply the catalyst 28 to the catalyst mix/run tank 46 and/or other catalyst transfer means. The control system 90 may receive an additional input signal 92 indicative of a demand for the catalyst solution 22 in the precontactor 66. For example, the input signal 92 may be indicative of a concentration of the catalyst 28 in the catalyst complex 14 or the level of the catalyst complex 14 in the precontactor 66 that is below a setpoint. In response, the control system 90 may activate an output, such as an actuator for the catalyst solution pump 62 and/or the catalyst solution control valve 64, to supply the catalyst solution 22 to the precontactor 66. In other embodiments, the control system 90 may receive an additional input signal 92 indicative of a demand for the catalyst complex 14 in the reactor system 12. For example, the input signal 92 may be indicative of a flow rate of the catalyst complex 14 to the reactor system 12 that is below a setpoint and may be transmitted by the catalyst complex flow sensor 100. In response, the control system 90 may activate an output, such as an actuator for the precontactor pump 82, to supply more catalyst complex 14 to the reactor system 12. In further embodiments, the control system 90 may receive an additional input signal 92 indicative of a temperature of the catalyst solution 22 in the catalyst mix/run tank 46. For example, the input signal 92 may be transmitted by the catalyst mix/run tank temperature sensor 94 and indicate that the temperature of the catalyst solution 22 is below a setpoint. In response, the control system 90 may activate an output, such as an actuator for the heating system 56, to supply additional heat to the catalyst mix/run tank 46. The control system 90 may operate in a similar manner to supply heat to the precontactor 66 based on data acquired via an input signal 92 from the precontactor temperature sensor 98.

According to certain embodiments, the control system 90 may be a Distributed Control System (DCS). The control system 90 may include one or more automation controllers, microprocessors, instruction set processors, graphics processors, analog to digital converters, interface boards, and/or related chip sets. Further, the control system 90 may cooperate with storage that stores executable code, data, and instructions for the control system 90. For example, the storage may store non-transitory machine-readable code for maintaining a temperature of the catalyst solution 22 above a threshold based on measured process variables. The storage may include volatile memory, such as random access memory, and/or non-volatile memory, such as read only memory, flash memory, a hard drive, or any other suitable optical, magnetic, or solid-state computer readable media, as well as a combination thereof. The control system 90 may also include a display and a user interface. According to certain embodiments, the display and the user interface may be part of an operator workstation. The display may display a variety of information about the manufacturing system 10. For example, the display may display graphs, trends, mass balances, energy balances, process data, such as measured process variables, and/or predictive data, among others that facilitate user monitoring and control of the manufacturing system 10.

According to certain embodiments, the display may display screens of the user interface that facilitate entry of user inputs. For example, a user may enter desired operating parameters (e.g., setpoints) or adjustments that should be made to the manufacturing system 10. In certain embodiments, a user may review an essentially instantaneous reaction rate or trend shown on the display and may enter a desired catalyst feed rate value or catalyst feed rate adjustment. In another example, a user may adjust the temperature of the reactor system 12 or one or more of the feed rates through the user interface. However, in other embodiments, at least some of the operating conditions may be adjusted automatically by the control system 90. For example, in certain embodiments, the control system 90 may automatically adjust the flow rate of catalyst 28 to the catalyst mix/run tank 46 based on a measured concentration of the catalyst 28 in the catalyst solution 22.

In certain embodiments, the control system 90 may be used to maintain a temperature of the catalyst solution 22 and/or the catalyst complex 14 above a threshold. The threshold may be selected to help prevent precipitation of the catalyst 28 out of the catalyst solution 22 and/or the catalyst complex 14. In certain embodiments, the threshold may be between approximately 40 degrees Celsius to approximately 50 degrees Celsius. In one embodiment, the threshold may be approximately 45 degrees Celsius. A not-to-exceed temperature threshold, such as approximately 60 degrees Celsius or approximately 65 degrees Celsius, may be selected based on the particular catalyst 28 used to avoid degradation of the catalyst 28. In one embodiment, the threshold may be between approximately 40 degrees Celsius and approximately 65 degrees Celsius. The catalyst mix/run tank temperature sensor 94 may indicate a temperature of the catalyst solution 22 and the precontactor temperature sensor 98 may indicate a temperature of the catalyst complex 14. Based on the input signals 92 received from the temperature sensors 96 and/or 98, the control system 90 may send control signals 102 to the catalyst mix/run tank heating system 56 and/or the precontactor heating system 78 to maintain the temperatures of the catalyst solution 22 and/or the catalyst complex 14, respectively, above the threshold.

In other embodiments, the control system 90 may be used to maintain a concentration of the catalyst 28 in the catalyst solution 22 and/or the catalyst complex 14 above a threshold. The threshold may be selected to help provide a desired amount of the catalyst 28 to reach the reactor system 12. In certain embodiments, the catalyst concentration threshold may be above approximately 0.40 weight percent in the solvent 30. This concentration threshold may be greater than the concentration of catalyst solution 22 provided by off-site vendors because off-site vendors may be limited by transportation issues. Thus, present embodiments may enable the size of the catalyst mix/run tank 46 and associated equipment and lines to be reduced relative to traditional operations. In a certain embodiment, the catalyst concentration threshold may be approximately 0.47 weight percent in the solvent 30. The catalyst mix/run tank concentration sensor 96 may provide the input signal 92 to the control system 90 indicative of the concentration of the catalyst 28 in the catalyst solution 22. In response to the input signal 92 from the catalyst mix/run tank concentration sensor 96, the control system 90 may transmit the control signal 102 to the catalyst control valve 44 and/or the solvent control valve 50 to maintain the concentration of the catalyst 28 in the catalyst solution 22 above the threshold. For example, the control signal 102 may open the catalyst control valve 44 and/or close the solvent control valve 50 if the indicated concentration of the catalyst 28 in the catalyst solution 22 is below the threshold. Similarly, the control system 90 may close the catalyst control valve 44 and/or open the solvent control valve 50 if the concentration of the catalyst 28 in the catalyst solution 22 is above the threshold. In a similar manner, the control system 90 may be used to adjust one or more of the catalyst solution transfer pump 62, catalyst solution control valve 64, and/or cocatalyst pump 70 to adjust or maintain the concentration of the catalyst 28 in the catalyst complex 14 in the precontactor 66. In such embodiments, the precontactor 66 may include a concentration sensor similar to the catalyst mix/run tank concentration sensor 96 to provide the input signal 92 to the control system 90. Further, the control system 90 may transmit control signals 102 to the precontactor pump 82 to adjust or maintain a flow rate of the catalyst complex 14 to the reactor system 12. In other embodiments, the control system 90 may also be used to control the catalyst mix/run tank motor 54 and/or the precontactor motor 76.

The concentration sensor 96 shown in FIG. 2 may use various techniques, such as spectrophotometry, to determine the concentration of the catalyst 28 in the catalyst solution 22. In one embodiment, the concentration sensor 96 may be an ultraviolet-visible photometric analyzer (i.e., a UV-Vis analyzer), which may utilize the Beer-Lambert law to determine the concentration of the catalyst 28. Specifically, the UV-Vis analyzer may pass a wavelength of light through the catalyst solution 22 and measure the absorbance of the light at the selected wavelength. The measured absorbance may then be compared to a calibration curve to determine the concentration of the catalyst 28. The specific wavelength of light may be selected to have little or no absorption by the solvent 30, thereby reducing errors in the determined concentration. Thus, the absorbance of light at the selected wavelength may be essentially a function of the concentration of the catalyst 28 in the catalyst solution 22. The UV-Vis analyzer may used in various ways, such as, but not limited to, providing a continuous on-line indication of the concentration of the catalyst 28 in the catalyst solution 22 and/or the catalyst complex 14, analyzing batches of the catalyst solution 28 and/or the catalyst complex 14, and so forth. In certain embodiments, the catalyst solution 22 may include particles or other particulate matter that may affect the spectrophotometric analysis. Thus, in certain embodiments, the UV-Vis analyzer may include a filter or similar device to remove particles and/or other matter from the catalyst solution 22. In addition, in other embodiments, a measurement cell of the UV-Vis analyzer may be flushed on a regular basis, e.g., daily, to reduce buildup of material that may affect the accuracy of the measurement. In further embodiments, other techniques may be used to determine the concentration of the catalyst 28 in the catalyst solution 22.

Figure 3:
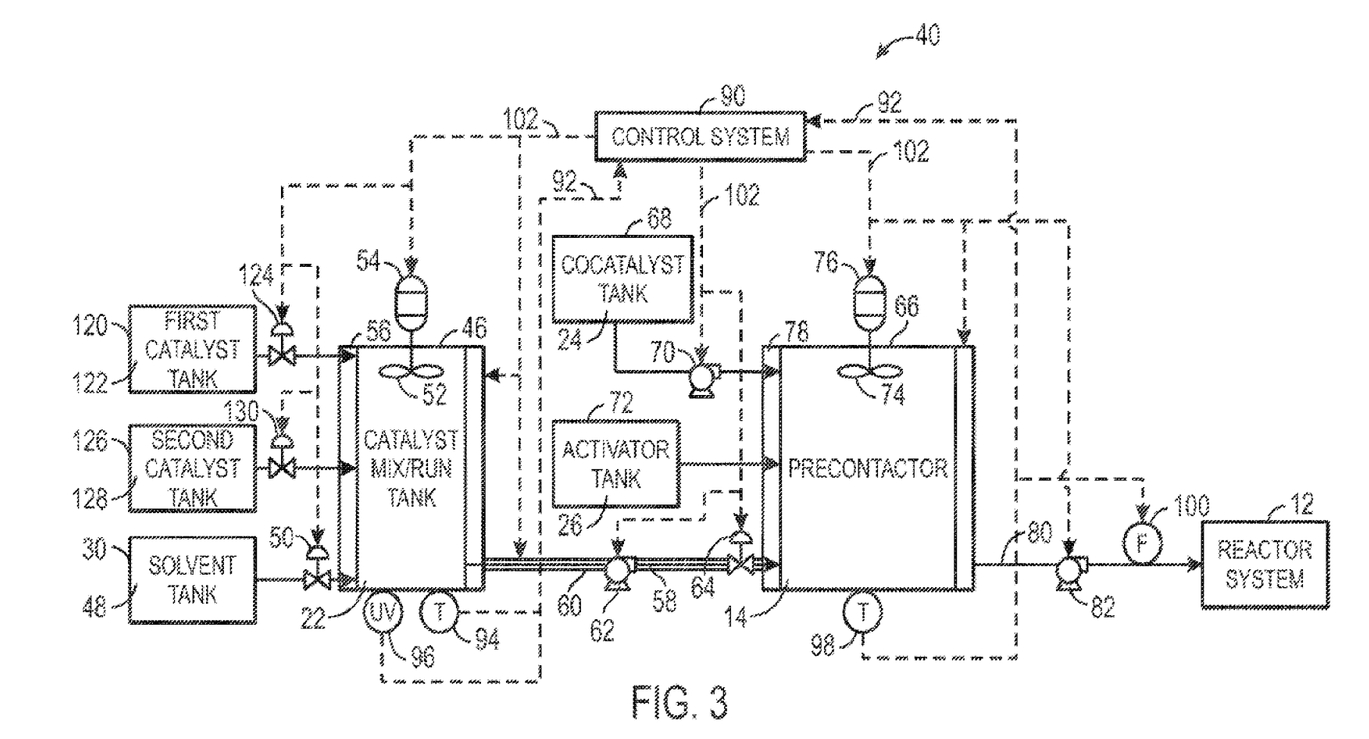
FIG. 3 is a schematic flow diagram of an embodiment of a catalyst preparation system with more than one catalyst tank that may be employed in the polyolefin manufacturing system of FIG. 1, in accordance with present embodiments.

FIG. 3 depicts an embodiment of the catalyst preparation system 40 that can be employed in the manufacturing system 10 shown in FIG. 1. In particular, FIG. 3 depicts a system that uses two catalysts. For example, a first catalyst tank 120 may be used to store a first catalyst 122 and a first catalyst control valve 124 may be used to control the flow of the first catalyst 122 to the catalyst mix/run tank 46. The catalyst preparation system 40 may also include a second catalyst tank 126 to store a second catalyst 128 and a second catalyst control valve 130 may be used to flow the second catalyst 128 to the catalyst mix/run tank 46. The use of the first and second catalysts 122 and 128 may facilitate production of polymer particles 20 with certain desired characteristics compared to polymer particles 20 produced using a single catalyst. In other respects, the catalyst preparation system 40 shown in FIG. 3 is similar to the system 40 shown in FIG. 2.

Figure 4:
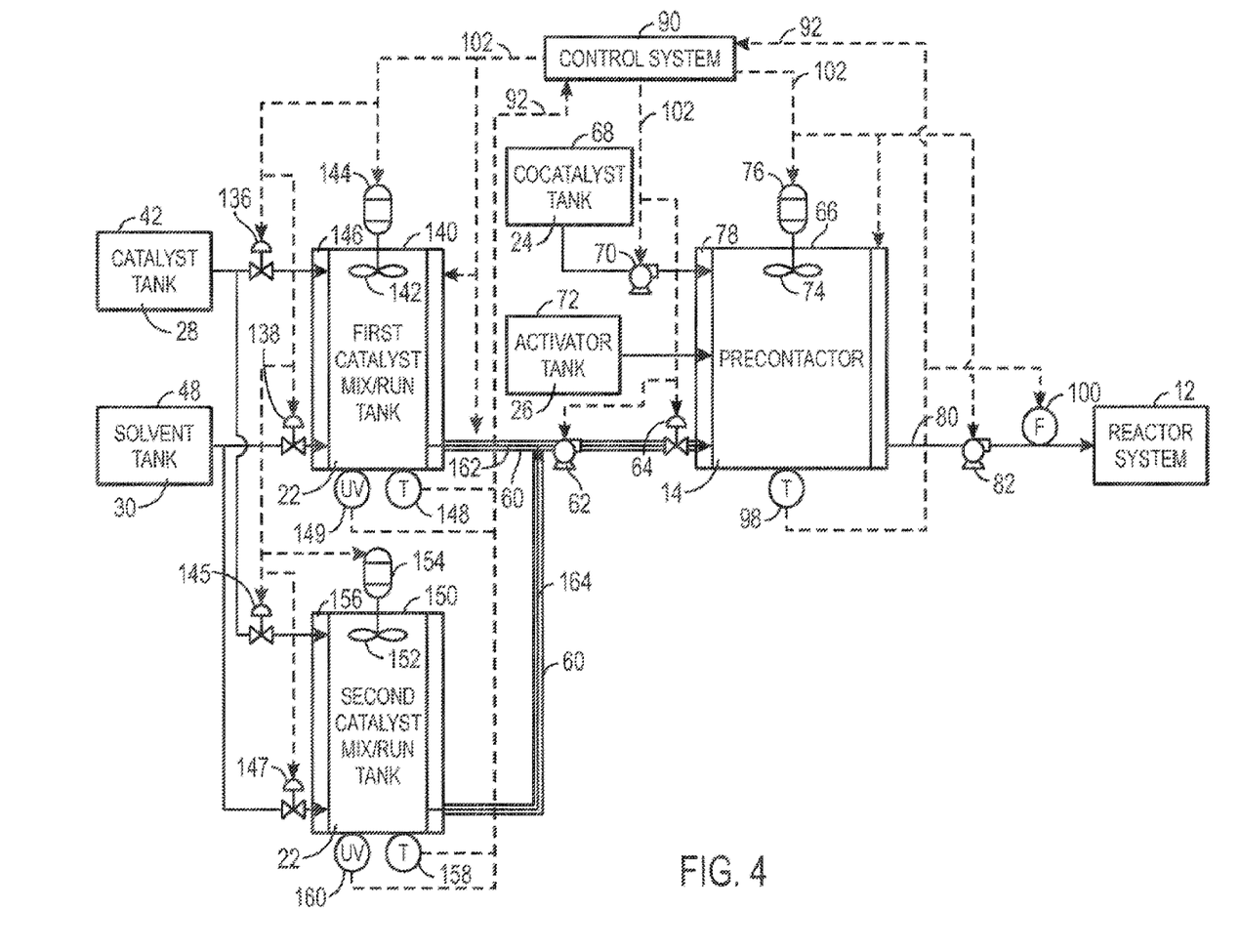
FIG. 4 is a schematic flow diagram of an embodiment of a catalyst preparation system with more than one catalyst mix/run tank that may be employed in the polyolefin manufacturing system of FIG. 1, in accordance with present embodiments.

FIG. 4 depicts an embodiment of the catalyst preparation system 40 with two catalyst mix/run tanks Specifically, a first catalyst control valve 136 may control the flow rate of the catalyst 28 to a first catalyst mix/run tank 140 and a first solvent control valve 138 may control the flow rate of the solvent 30 to the first catalyst mix/run tank 140. The first catalyst mix/run tank 140 may include a first agitator 142 driven by a first motor 144 and may be heated using a first heating system 146. In addition, the first catalyst mix/run tank 140 may include a first temperature sensor 148 and a first concentration sensor 149. Similarly, a second catalyst control valve 145 may control the flow rate of the catalyst 28 to a second catalyst mix/run tank 150 and a second solvent control valve 147 may control the flow rate of the solvent 30 to the second catalyst mix/run tank 150. The second catalyst mix/run tank 150 may include a second agitator 152 driven by a second motor 154, a second heating system 156, a second temperature sensor 158, and a second concentration sensor 160. The catalyst solution 122 from the first catalyst mix/run tank 140 may be transferred to the precontactor 66 through a first transfer line 162 and the catalyst solution 22 from the second catalyst mix/run tank 150 may be transferred via a second transfer line 164. The first and second catalyst mix/run tanks 140 and 150 may be used as online spares for one another. For example, the first catalyst mix/ run tank 140 may be used to supply the catalyst solution 22 to the precontactor 66 until the first catalyst mix/run tank 140 is approximately empty, below a minimum level threshold, or otherwise out-of-service. At that point, the second catalyst mix/run tank 150 may be used to supply the catalyst solution 22 to the precontactor 66 while the first catalyst mix/run tank 140 is unavailable. Similarly, when the second catalyst mix/run tank 150 is approximately empty, below a minimum level threshold, or otherwise out-of-service, the first catalyst mix/run tank 140 may be used to supply the catalyst solution 22 to the precontactor 66. In other respects, the catalyst preparation system 40 shown in FIG. 4 is similar to the system 40 shown in FIG. 2.

Figure 5:
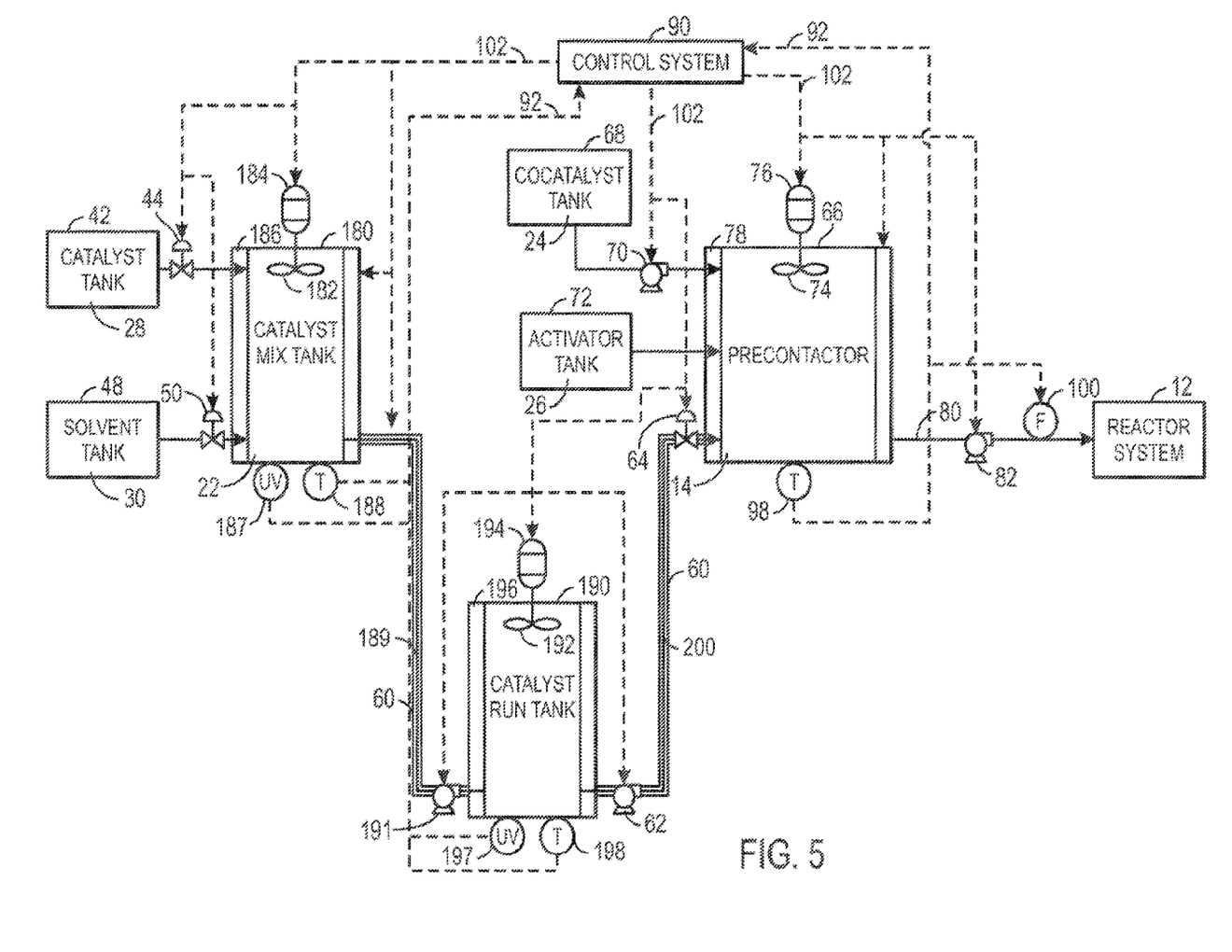
FIG. 5 is a schematic flow diagram of an embodiment of a catalyst preparation system with separate mix and run catalyst tanks that may be employed in the polyolefin manufacturing system of FIG. 1, in accordance with present embodiments.

FIG. 5 depicts an embodiment of the catalyst preparation system 40 including separate mix and run tanks Specifically, the catalyst preparation system 40 includes a catalyst mix tank 180 that includes a catalyst mix agitator 182 driven by catalyst mix motor 184. The catalyst mix tank 180 may include a catalyst mix heating system 186, a catalyst mix concentration sensor 187, and a catalyst mix temperature sensor 188. A catalyst mix pump 191 may be used to transfer the catalyst solution 22 from the catalyst mix tank 180 to a catalyst run tank 190 via catalyst mix transfer line 189. The catalyst run tank 190 may include a catalyst run agitator 192 driven by catalyst run motor 194, a catalyst run heating system 196, a catalyst run concentration sensor 197, and a catalyst run temperature sensor 198. A catalyst run transfer line 200 may be used to transfer the catalyst solution 22 from the catalyst run tank 190 to the precontactor 66. As shown in FIG. 5, the catalyst mix tank 180 may be used to prepare the catalyst solution 22 and the catalyst run tank 190 may be used to supply the catalyst solution 22 to the precontactor 66. When the catalyst run tank 190 is approximately empty or below a minimal level threshold, the catalyst solution 22 from the catalyst mix tank 180 may be used to refill the catalyst run tank 190. Additional catalyst solution 22 may then be prepared in the catalyst tank 180 to be transferred later to the catalyst run tank 190. In other respects, the catalyst preparation system 40 shown in FIG. 5 is similar to the system 40 shown in FIG. 2.

Figure 6:
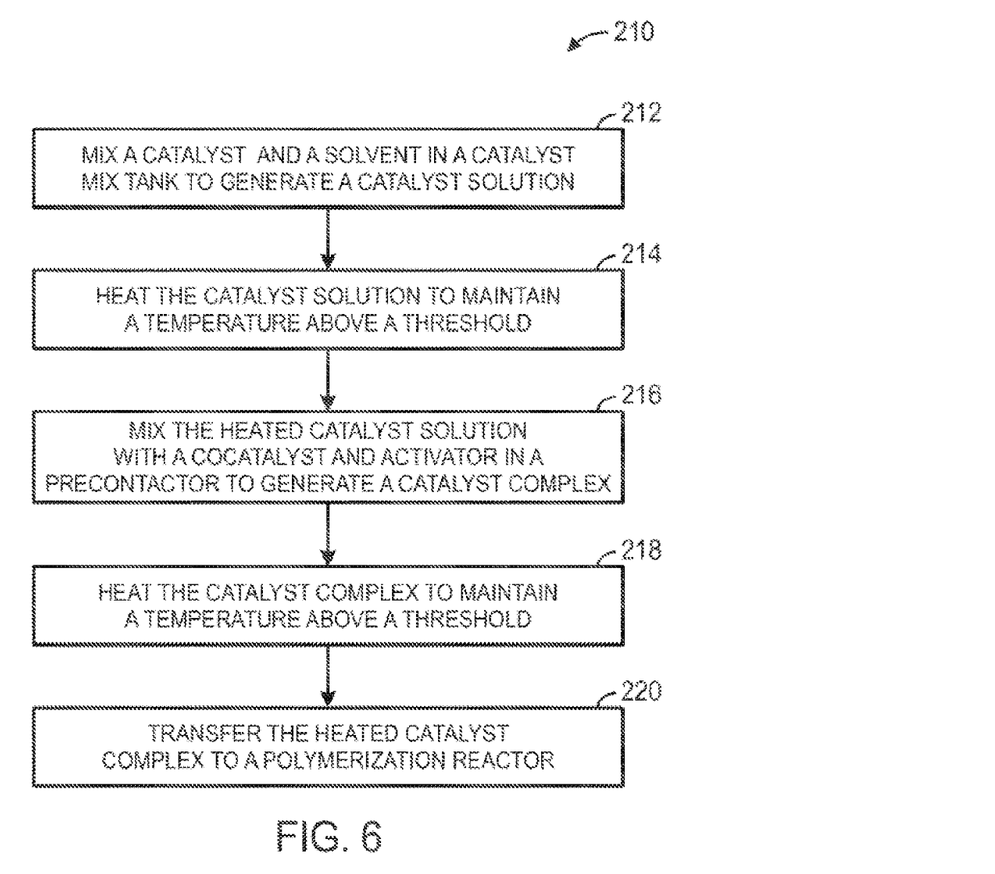
FIG. 6 is a flow chart depicting a method for preparing catalyst in accordance with present embodiments.

FIG. 6 depicts a method 210 for preparing the catalyst complex 14. The method 210 may begin by mixing the catalyst 28 and the solvent 30 in the catalyst mix/run tank 46 to generate the catalyst solution 22 (block 212). For example, the control system 90 may activate the catalyst mix/run tank agitator 52 to mix the contents of the catalyst mix/run tank 46 to generate the catalyst solution 22. The catalyst solution 22 may also be prepared, for example, in the first catalyst mix/run tank 140, the second catalyst mix/run tank 150, or the catalyst mix tank 180. The method 210 may then continue by heating the catalyst solution 22 to maintain a temperature of the catalyst solution 22 above a threshold (block 214). For example, the control system 90 may be used to control the heat provided to the catalyst solution 22 via the catalyst mix/run tank heating system 56 based on the temperature sensed by the catalyst mix/run tank temperature sensor 94. In other embodiments, the control system 90 may be used to maintain the temperature of the catalyst solution 22 above the threshold in, for example, the first catalyst mix/run tank 140, the second catalyst mix/run tank 150, the catalyst mix tank 180, or the catalyst run tank 190. The method 210 may then continue by mixing the heated catalyst solution 22 with the cocatalyst 24 and the activator 26 in the precontactor 66 to generate the catalyst complex 14 (block 216). For example, the control system 90 may use the precontactor agitator 74 to mix the contents of the precontactor 66 to generate the catalyst complex 14.

The method 210 may then continue by heating the catalyst complex 14 to maintain a temperature above a threshold (block 218). For example, the control system 90 may use the precontactor heating system 78 to maintain the temperature of the catalyst complex 14 above the threshold as determined by the precontactor temperature sensor 98. The method may then continue by transferring the heated catalyst complex 14 to the reactor system 12 (block 220). In certain embodiments, the control system 90 may be used to control the precontactor pump 82 to adjust the flow rate of the catalyst complex to the reactor system 12 as measured by the catalyst complex flow sensor 100.

ADDITIONAL DESCRIPTION

Systems and methods for catalyst preparation have been described. The following clauses are offered as further description of the disclosure.

Embodiment 1. A system, comprising: an agitator disposed inside a polymerization catalyst tank and configured to mix or dissolve at least a portion or all of a polymerization catalyst and a solvent to generate a polymerization catalyst solution; a heating system coupled to the polymerization catalyst tank and configured to maintain a temperature of the polymerization catalyst solution above a threshold; a precontactor configured to receive feed streams comprising an activator and the polymerization catalyst solution from the polymerization catalyst tank to generate a catalyst complex; and a transfer line configured to transfer the catalyst complex from an outlet of the precontactor to a reactor.

Embodiment 2. The system of embodiment 1, wherein the precontactor comprises: a second agitator disposed inside the precontactor and configured to mix the activator and polymerization catalyst solution; and a second heating system coupled to the precontactor and configured to maintain a temperature of the catalyst complex above a second threshold.

Embodiment 3. The system defined in any preceding embodiment, comprising the reactor configured to polymerize monomer into polymer solids in the presence of the catalyst complex.

Embodiment 4. The system defined in any preceding embodiment, comprising a plurality of reactors configured to polymerize monomer into polymer solids in the presence of the catalyst complex.

Embodiment 5. The system defined in any preceding embodiment, wherein the plurality of reactors are operated in a series configuration or in a parallel configuration.

Embodiment 6. The system defined in any preceding embodiment, wherein the polymerization catalyst comprises a metallocene catalyst.

Embodiment 7. The system defined in any preceding embodiment, wherein the solvent comprises a comonomer.

Embodiment 8. The system defined in any preceding embodiment, wherein the comonomer comprises 1-hexene.

Embodiment 9. The system defined in any preceding embodiment, wherein the feed streams comprise a cocatalyst.

Embodiment 10. The system defined in any preceding embodiment, wherein the cocatalyst comprises triisobutylaluminum, triethylaluminum, or any combination thereof.

Embodiment 11. The system defined in any preceding embodiment, wherein the activator comprises a solid super acid.

Embodiment 12. The system defined in any preceding embodiment, wherein the heating system is configured to heat a second transfer line configured to transfer the polymerization catalyst solution from the polymerization catalyst tank to the precontactor.

Embodiment 13. The system defined in any preceding embodiment, comprising a sensor configured to provide an indication of a concentration of the polymerization catalyst in the polymerization catalyst solution.

Embodiment 14. A method, comprising: making a polymerization catalyst solution by dissolving a polymerization catalyst with one or more solvents in a heated polymerization catalyst tank; making a polymerization catalyst complex by combining at least a portion of the polymerization catalyst solution with an activator in a precontactor; and transferring the polymerization catalyst complex from the precontactor to a reactor.

Embodiment 15. The method or system defined in any preceding embodiment, comprising combining a cocatalyst with the polymerization catalyst solution and the activator in the precontactor.

Embodiment 16. The method or system defined in any preceding embodiment, comprising heating the polymerization catalyst complex in the precontactor.

Embodiment 17. The method or system defined in any preceding embodiment, comprising maintaining the polymerization catalyst solution in the polymerization catalyst tank at a temperature between approximately 40 degrees Celsius to 50 degrees Celsius.

Embodiment 18. The method or system defined in any preceding embodiment, comprising polymerizing a monomer in the presence of the catalyst complex to produce polymer solids in the reactor.

Embodiment 19. The method or system defined in any preceding embodiment, comprising measuring a concentration of the polymerization catalyst in the polymerization catalyst solution using an ultraviolet-visible photometric analyzer.

Embodiment 20. The method or system defined in any preceding embodiment, comprising maintaining the concentration of the polymerization catalyst in the polymerization catalyst solution above approximately 0.40 weight percent in the solvent.

Embodiment 21. A system, comprising: one or more automation controllers configured to: receive a first input indicative of a demand for a metallocene catalyst in a metallocene catalyst tank; activate a first output to supply the metallocene catalyst to the metallocene catalyst tank, such that the metallocene catalyst and a solvent mix in the metallocene catalyst tank to form a metallocene catalyst solution; receive a second input indicative of a demand for the metallocene catalyst solution in a precontactor; and activate a second output to supply the metallocene catalyst solution to the precontactor; such that the metallocene catalyst solution and an activator mix in the precontactor to form a metallocene catalyst complex.

Embodiment 22. The method or system defined in any preceding embodiment, wherein the one or more automation controllers are configured to: receive a third input indicative of a demand for the metallocene catalyst complex in a reactor; and activate a third output to supply the metallocene catalyst complex to the reactor.

Embodiment 23. The method or system defined in any preceding embodiment, wherein the first and second outputs comprise a control valve actuator, a pump actuator, or any combination thereof.

Embodiment 24. The method or system defined in any preceding embodiment, wherein the second input comprises a concentration of the metallocene catalyst in the metallocene catalyst tank.

Embodiment 25. The method or system defined in any preceding embodiment, comprising a sensor configured to generate the second input, wherein the sensor comprises an ultraviolet-visible photometric analyzer.

Embodiment 26. The method or system defined in any preceding embodiment, wherein the one or more automation controllers are configured to: receive a fourth input indicative of a temperature of the metallocene catalyst solution in the metallocene catalyst tank; and activate a fourth output to supply heat to the metallocene catalyst tank.

Embodiment 27. A catalyst complex, comprising: a metallocene catalyst solution, comprising a mixture of a metallocene catalyst and a solvent, wherein a concentration of the metallocene catalyst in the metallocene catalyst solution is greater than approximately 0.40 weight percent in the solvent; and an activator.

Embodiment 28. The method, system, or catalyst complex defined in any preceding embodiment, wherein the solvent comprises a comonomer, 1-hexene, cyclohexane, heptane, an alkene, an alkane, a cycloalkene, a cycloalkane, or a combination thereof.

Embodiment 29. The method, system, or catalyst complex defined in any preceding embodiment, comprising a cocatalyst.

Embodiment 30. The method, system, or catalyst complex defined in any preceding embodiment, wherein the cocatalyst comprises triisobutylaluminum, triethylaluminum, or any combination thereof.

Embodiment 31. The method, system, or catalyst complex defined in any preceding embodiment, wherein the activator comprises a solid super acid.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A polymer manufacturing system comprising:
   (A) a catalyst solution tank configured to contain a metallocene catalyst solution and to supply a precontactor with at least a portion of the metallocene catalyst solution;
   (B) a precontactor configured to contact the metallocene catalyst solution, an activator, and a co-catalyst to form a catalyst complex;
   (C) a polymerization reactor system configured to contact the catalyst complex with an olefin monomer and an optional olefin comonomer to produce a polyolefin;
   (D) an ultraviolet-visible analyzer configured to determine a first concentration of a metallocene catalyst in the metallocene catalyst solution; and
   (E) a control system configured to control the first concentration of the metallocene catalyst in the metallocene catalyst solution.

2. The polymer manufacturing system of claim 1, wherein the catalyst solution tank contains an agitator configured to mix the metallocene catalyst and a solvent to form the metallocene catalyst solution.

3. The polymer manufacturing system of claim 1, further comprising a heating system coupled to the catalyst solution tank and configured to maintain a temperature of the metallocene catalyst solution.

4. The polymer manufacturing system of claim 1, further comprising a transfer line configured to transfer the catalyst complex from an outlet of the precontactor to the polymerization reactor system.

5. The polymer manufacturing system of claim 1, wherein the polymerization reactor system comprises one or more polymerization reactors selected independently from a fluidized bed reactor, a gas-phase reactor, a loop slurry reactor, or any combination thereof.

6. The polymer manufacturing system of claim 1, wherein the polymerization reactor system comprises a loop slurry reactor.

7. The polymer manufacturing system of claim 1, wherein the metallocene catalyst solution contains a first metallocene catalyst and a second metallocene catalyst.

8. The polymer manufacturing system of claim 1, wherein the polymerization reactor system is configured to contact the catalyst complex with ethylene and an olefin comonomer comprising 1-butene, 1-hexene, 1-octene, or a mixture thereof.

9. The polymer manufacturing system of claim 1, wherein the ultraviolet-visible analyzer further comprises a filter for filtering a sample of the metallocene catalyst solution containing the metallocene catalyst prior to analysis.

10. The polymer manufacturing system of claim 1, wherein the ultraviolet-visible analyzer is further configured to determine the first concentration of the metallocene catalyst in the metallocene catalyst solution at a selected wavelength using a calibration curve.

11. A polymer manufacturing system comprising:
(A) a catalyst solution tank configured to contain a metallocene catalyst solution and to supply a precontactor with at least a portion of the metallocene catalyst solution;
(B) a precontactor configured to contact the metallocene catalyst solution, an activator, and a co-catalyst to form a catalyst complex;
(C) a polymerization reactor system configured to contact the catalyst complex with an olefin monomer and an optional olefin comonomer to produce a polyolefin;
(D) an ultraviolet-visible analyzer (i) configured to determine a first concentration of a metallocene catalyst in the metallocene catalyst solution, and (ii) configured to determine a second concentration of the metallocene catalyst in the catalyst complex in the precontactor; and
(E) a control system (i) configured to control the first concentration of the metallocene catalyst in the metallocene catalyst solution, and (ii) configured to control the second concentration of the metallocene catalyst in the catalyst complex in the precontactor.

12. The polymer manufacturing system of claim 11, further comprising a first transfer line configured to transfer the catalyst complex from an outlet of the precontactor to the polymerization reactor system.

13. The polymer manufacturing system of claim 11, further comprising a second transfer line configured to transfer the metallocene catalyst solution from the catalyst solution tank to the precontactor.

14. The polymer manufacturing system of claim 11, wherein the polymerization reactor system comprises one or more polymerization reactors selected independently from a fluidized bed reactor, a gas-phase reactor, a loop slurry reactor, or any combination thereof.

15. The polymer manufacturing system of claim 11, wherein the polymerization reactor system comprises a loop slurry reactor.

16. The polymer manufacturing system of claim 11, wherein the ultraviolet-visible analyzer is further configured to determine the first concentration and the second concentration at a selected wavelength using a calibration curve.

17. The polymer manufacturing system of claim 11, wherein:
the activator comprises a chemically-treated solid oxide; and
the co-catalyst comprises an alkyl aluminum compound.

18. The polymer manufacturing system of claim 11, wherein the polymerization reactor system is configured to contact the catalyst complex with ethylene and an olefin comonomer comprising 1-butene, 1-hexene, 1-octene, or a mixture thereof.

19. The polymer manufacturing system of claim 11, wherein the catalyst solution tank contains an agitator configured to mix the metallocene catalyst and a solvent to form the metallocene catalyst solution.

20. The polymer manufacturing system of claim 11, further comprising a heating system coupled to the catalyst solution tank and configured to maintain a temperature of the metallocene catalyst solution.

21. The polymer manufacturing system of claim 11, wherein the ultraviolet-visible analyzer further comprises a filter for filtering a sample of the metallocene catalyst solution containing the metallocene catalyst prior to analysis.

* * * * *